(12) United States Patent
Chang

(10) Patent No.: US 6,411,123 B1
(45) Date of Patent: Jun. 25, 2002

(54) MULTI-OPTION SETTING DEVICE FOR PERIPHERAL CONTROL CHIPSET

(75) Inventor: Nai-Shung Chang, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 09/404,624

(22) Filed: Sep. 23, 1999

(30) Foreign Application Priority Data

May 7, 1999  (TW) ........................................ 88107474 A

(51) Int. Cl.[7] ................................................ G06F 7/38
(52) U.S. Cl. .............................. 326/38; 326/37; 326/47
(58) Field of Search ............................ 326/37, 38, 41, 326/47

(56) References Cited

U.S. PATENT DOCUMENTS 5,450,082 A * 9/1995 Finley et al. ................ 341/141
6,246,258 B1 * 6/2001 Lesea .......................... 326/39

* cited by examiner

Primary Examiner—Michael Tokar
Assistant Examiner—Anh Q. Tran
(74) Attorney, Agent, or Firm—J. C. Patents

(57) ABSTRACT

A multi-option setting device is provided for use in association with a connecting pin of a chipset for the purpose of allowing user-selection from more than two setting options to set the chipset to perform one of more than two I/O functions through the associated connecting pin. The multi-option setting device includes voltage setting means for generating a user-specified input voltage; a voltage comparison circuit for use to determine which prespecified voltage range the user-specified input voltage lies; a latch circuit for latching the output of the voltage comparison circuit; and a control unit for setting the connecting pin to the user-selected I/O function corresponding to the user-specified input voltage. The user-specified input voltage is obtained from an externally-connected voltage divider and is compared by the voltage comparison circuit to determine which voltage range the user-specified input voltage lies to thereby generate an output logic signal whose value corresponds to the desired option. This allows the associated connecting pin to be optionally set to be used for a user-specified I/O function. Preferably, the connecting pin is a loudspeaker connecting pin. This multi-option setting device allows the user to select from more than two options, while nevertheless allowing the overall system to operate normally without being affected by the setting.

12 Claims, 3 Drawing Sheets

MULTI-OPTION SETTING DEVICE FOR PERIPHERAL CONTROL CHIPSET

CROSS-REFERENCE TO RELATED APPLICATION

This application claims the priority benefit of Taiwan application serial No. 88107474, filed May 7, 1999, the full disclosure of which is incorporated herein by reference.

BACKGROUND OF THE INVENTION

1. Field of the Invention

This invention relates to means for setting options to a computer chipset, and more particularly, to a multi-option setting device for a peripheral control chipset, which is designed for use in association with a connecting pin of the chipset for the purpose of allowing user-selection from more than two setting options to set the chipset to perform one of more than two I/O functions through the associated connecting pin.

2. Description of Related Art

An IC chip is typically provided with a plurality of pins that can be externally connected for input/output of various signals. Some types of chips come with pins that can be selectively set to perform different I/O functions. For example, the South Bridge chipset comes with an IDE2/Audio pin which can be selectively set to be used either for IDE2 I/O function or for audio I/O function. More specifically, when the IDE2/Audio pin is set to a low-voltage logic stage (typically the ground voltage, which is below 0.7 V) at power-on, it is set to be used for IDE2 I/O function; and whereas, when set to a high-voltage logic state (typically above 2.8 V) at power-on, it is set to be used for audio I/O function. These two different settings are depicted in the following with reference to FIGS. 1 and 2, respectively.

FIG. 1 is a schematic diagram of a South Bridge chipset 10 whose IDE2/Audio pin is specifically set to be used for IDE2 I/O function. As shown, the IDE2/Audio pin is internally connected to a control unit 12 and externally connected via a pull-down resistor R1 to the ground. At power-on, the IDE2/Audio pin will take on the ground voltage via the pull-down resistor R1, thereby being set to a low-voltage logic stage. This condition then causes the control unit 12 to set the IDE2/Audio pin to be used for IDE2 I/O function.

FIG. 2 is a schematic diagram of another South Bridge chipset 20 whose IDE2/Audio pin is specifically set to be used for audio I/O function. As shown, the IDE2/Audio pin is internally connected to a control unit 22 and externally connected via a pull-up resistor R2 to a system voltage $V_{CC}$ representative of a high-voltage logic state. At power-on, the IDE2/Audio pin will take on the system voltage $V_{CC}$ via the pull-up resistor R2, thereby being set to a high-voltage logic state. This condition then causes the control unit 22 to set the IDE2/Audio pin to be used for audio I/O function.

In addition to the schemes shown in FIGS. 1 and 2, the selective setting of the IDE2/Audio pin between IDE2 I/O function and audio I/O function can be carried out by means of the BIOS (Basic Input-Output System) of the PC. This scheme, however, requires the PC to be restarted each time the setting is changed so as to allow the new setting to take effect, which is quite inconvenient for the user to do so.

Therefore, the prior art only allows the user to selectively use the IDE2/Audio pin of a South Bridge chipset for one of two I/O functions. There exists, however, a need for a multi-option setting device that allows one single connecting pin to be selectively used for more than two I/O purposes, for example three I/O functions including IDE2 I/O function, audio I/O function, and GPIO (General Purpose Input/Output) I/O function.

Moreover, some customers may demand the elimination of certain I/O functions, such as the IDE2 I/O function. In this case, the IDE2/Audio pin would not be required to be set for IDE2 I/O function.

SUMMARY OF THE INVENTION

It is therefore an objective of this invention to provide a multi-option setting device for a chipset, which allows the user to select from more than two setting options for the purpose of setting the chipset to perform a selected I/O function through the same connecting pin of the chipset.

In accordance with the foregoing and other objectives of this invention, a multi-option setting device for chipset is provided. The multi-option setting device is designed for use in association with a connecting pin of the chipset for the purpose of allowing user-selection from more than two setting options to set the chipset to perform one of more than two I/O functions through the associated connecting pin. The multi-option setting device comprises: (a) voltage setting means for generating a user-specified input voltage whose value corresponds to one of a plurality of I/O functions that can be performed by the chipset through the associated connecting pin, with each I/O function corresponding to a prespecified range of voltage levels; (b) a voltage comparison circuit for comparing the user-specified input voltage against a plurality of preset reference voltages to thereby generate an output signal indicative of which prespecified voltage range the user-specified input voltage lies; (c) a latch circuit for latching the output signal of the voltage comparison circuit; and (d) a control unit, in response to the latched output signal from the latch circuit, for setting the connecting pin to the user-selected I/O function corresponding to the user-specified input voltage.

The voltage comparison circuit includes: a plurality of analog comparators, each having a positive input end connected to receive the user-specified input voltage and a negative input end connected to receive one of the plurality of reference voltages; each analog comparator generating a first logic signal when the user-specified input voltage is greater in level than the reference voltage connected thereto, and a second logic signal when the user-specified input voltage is lower in level than the reference voltage connected thereto.

The foregoing multi-option setting device of the invention allows the user to specify a certain voltage level, and the user-specified input voltage is then compared by a voltage comparison circuit to determine which voltage range the user-specified input voltage lies to thereby generate an output logic signal whose value corresponds to the desired option. This multi-option setting device allows the user to select from more than two options, while nevertheless allowing the overall system to operate normally without being affected by the setting.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The invention provides a multi-option setting device for use in association with a connecting pin of a chipset, such as a South Bridge chipset, for the purpose of allowing user-selection from more than two setting options to set the chipset to perform one of more than two I/O functions through the associated connecting pin. A preferred embodiment of the multi-option setting device of the invention is disclosed in full details in the following with reference to FIG. 3.

Figure 1:
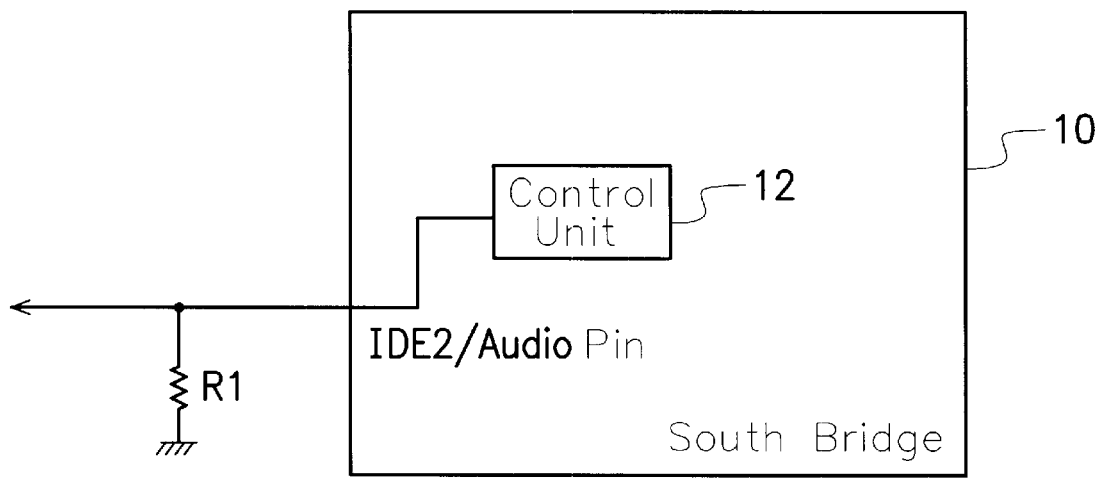
FIG. 1 is a schematic diagram of a South Bridge chipset whose IDE2/Audio pin is specifically set to be used for IDE2 I/O function.
Figure 2:
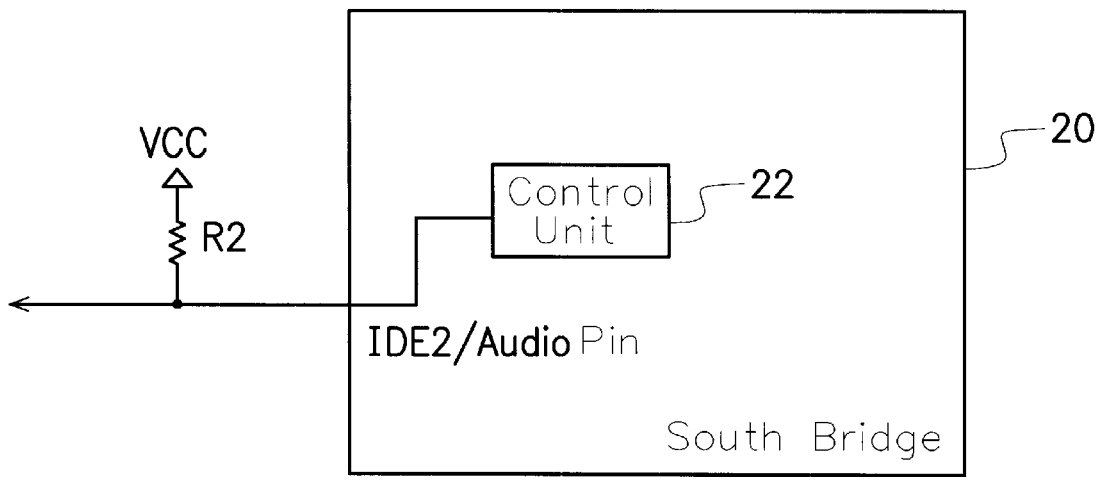
FIG. 2 is a schematic diagram of anther South Bridge chipset whose IDE2/Audio pin is specifically set to be used for audio I/O function.
Figure 3:
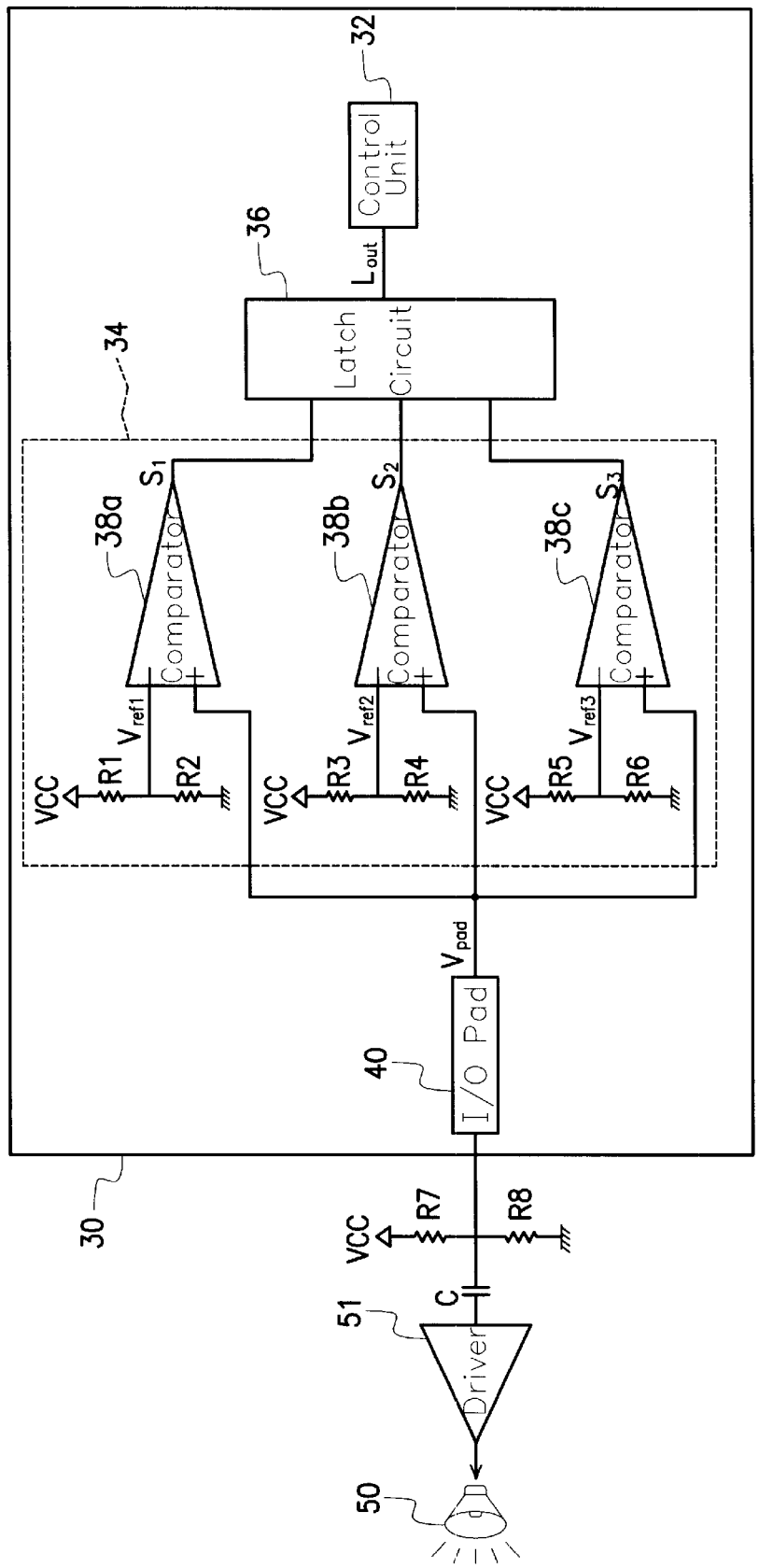
FIG. 3 is a schematic diagram of a chipset which is incorporated with the multi-option setting device of the invention, according to a preferred embodiment.

FIG. 3 is a schematic diagram of a chipset 30 which is incorporated with the multi-option setting device of the invention. As shown, the chipset 30 serving as a south bridge includes a control unit 32, a voltage comparison circuit 34 and a latch circuit 36, and an I/O pad 40. The I/O pad 40 is externally connected to a loudspeaker 50 via a pair of resistors R7, R8, a capacitor C, and a driver 51. The resistors R7, R8 are serially connected between a system voltage $V_{CC}$ and the ground to serve as a voltage divider to provide a user-specified input voltage to the I/O pad 40. The voltage comparison circuit 34 includes a first analog comparator 38a, a second analog comparator 38b, and a third analog comparator 38c.

The first analog comparator 38a has a positive end connected to receive the input voltage $V_{pad}$ received by the I/O pad 40 and a negative end connected to receive a first reference voltage $V_{ref1}$ which is an apportioned voltage from the system voltage $V_{CC}$ through the use of a first voltage divider consisting of resistors R1, R2. The first analog comparator 38a operates in such a manner that, if $V_{pad}>V_{ref1}$, it outputs a high-voltage logic state representative of a first logic state, for example 1; and whereas if $V_{pad}<V_{ref1}$, it outputs a low-voltage logic stage representative of a second logic state, for example 0. Alternatively, the first logic state can be 0, while the second logic state can be 1. The output of the first analog comparator 38a is denoted by $S_1$.

In a similar manner, the second analog comparator 38b has a positive end connected to receive the input voltage $V_{pad}$ received by the I/O pad 40 and a negative end connected to receive a second reference voltage $V_{ref2}$ which is an apportioned voltage from the system voltage $V_{CC}$ through the use of a second voltage divider consisting of resistors R3, R4. The second analog comparator 38b operates in such a manner that, if $V_{pad}>V_{ref2}$, it outputs a high-voltage logic state representative of a first logic state, for example 1; and whereas if $V_{pad}<V_{ref2}$, it outputs a low-voltage logic stage representative of a second logic state, for example 0. Alternatively, the first logic state can be 0, while the second logic state can be 1. The output of the second analog comparator 38b is denoted by $S_2$.

Still further, the third analog comparator 38c has a positive end connected to receive the input voltage $V_{pad}$ received by the I/O pad 40 and a negative end connected to receive a third reference voltage $V_{ref3}$ which is an apportioned voltage from the system voltage $V_{CC}$ through the use of a third voltage divider consisting of resistors R5, R6. The third analog comparator 38c operates in such a manner that, if $V_{pad}>V_{ref3}$, it outputs a high-voltage logic state representative of a first logic state, for example 1; and whereas if $V_{pad}<V_{ref3}$, it outputs a low-voltage logic stage representative of a second logic state, for example 0. Alternatively, the first logic state can be 0, while the second logic state can be 1. The output of the third analog comparator 38c is denoted by $S_3$.

The respective output signals $S_1$, $S_2$, $S_3$ from the three analog comparators 38a, 38b, 38c are then latched in the latch circuit 36 for transfer to the control unit 32. There are four possible values to the combination of these three output signals $S_1$, $S_2$, $S_3$, which can be then used to set the control unit 32 to one of four setting options.

Assume the reference voltages $V_{ref1}$, $V_{ref2}$, $V_{ref3}$ are respectively set to 2 V, 1.5 V, and 1 V. These voltage levels can be set by adjusting the resistors R1, R2, R3, R4, R5, R6 to suitable values, which is a well-known technique in the art of electric circuit design so that details thereof will not be further described.

If the user-specified input voltage is 1.8 V (i.e., $V_{pad}$=1.8 V), it will cause the voltage comparison circuit 34 to respond in such a manner that the first analog comparator 38a, whose reference voltage is set at 2 V, will output a low-voltage output; the second analog comparator 38b, whose reference voltage is set at 1.5 V, will output a high-voltage output; and the third analog comparator 38c, whose reference voltage is set at 1 V, will output a high-voltage output. In other words, this condition causes the voltage comparison circuit 34 to generate the output (S1, S2, S3)=(LOW, HIGH, HIGH). Assume the low-voltage logic stage represents the binary value 0, while the high-voltage logic state represents the binary value 1, then the output can be rewritten as (S1, S2, S3)=(0, 1, 1). The output (S1, S2, S3) is then latched in the latch circuit 36 as the output $L_{out}$ for the control unit 32. By checking the bit pattern of the latched signal $L_{out}$, the control unit 32 can then set the connecting pin coupled to the I/O pad 40 to a user-specified I/O functional pin, such as an AUDIO pin.

As a general rule, if the input voltage $V_{pad}$ is greater than 2 V, it will cause the voltage comparison circuit 34 to generate the output (S1, S2, S3)=(1, 1, 1); if between 1.5 V and 2 V, it will cause (S1, S2, S3)=(0, 1, 1); if between 1 V and 1.5 V, it will cause (S1, S2, S3)=(0, 0, 1); and if below 1 V, it will cause (S1, S2, S3)=(0, 0, 0). Therefore, there are a total of 4 options that can be set by using the multi-option setting device shown in FIG. 3. Fundamentally, the number of options is equal to one plus the number of analog comparators in the voltage comparison circuit 34, which can be more than three.

Figure 4:
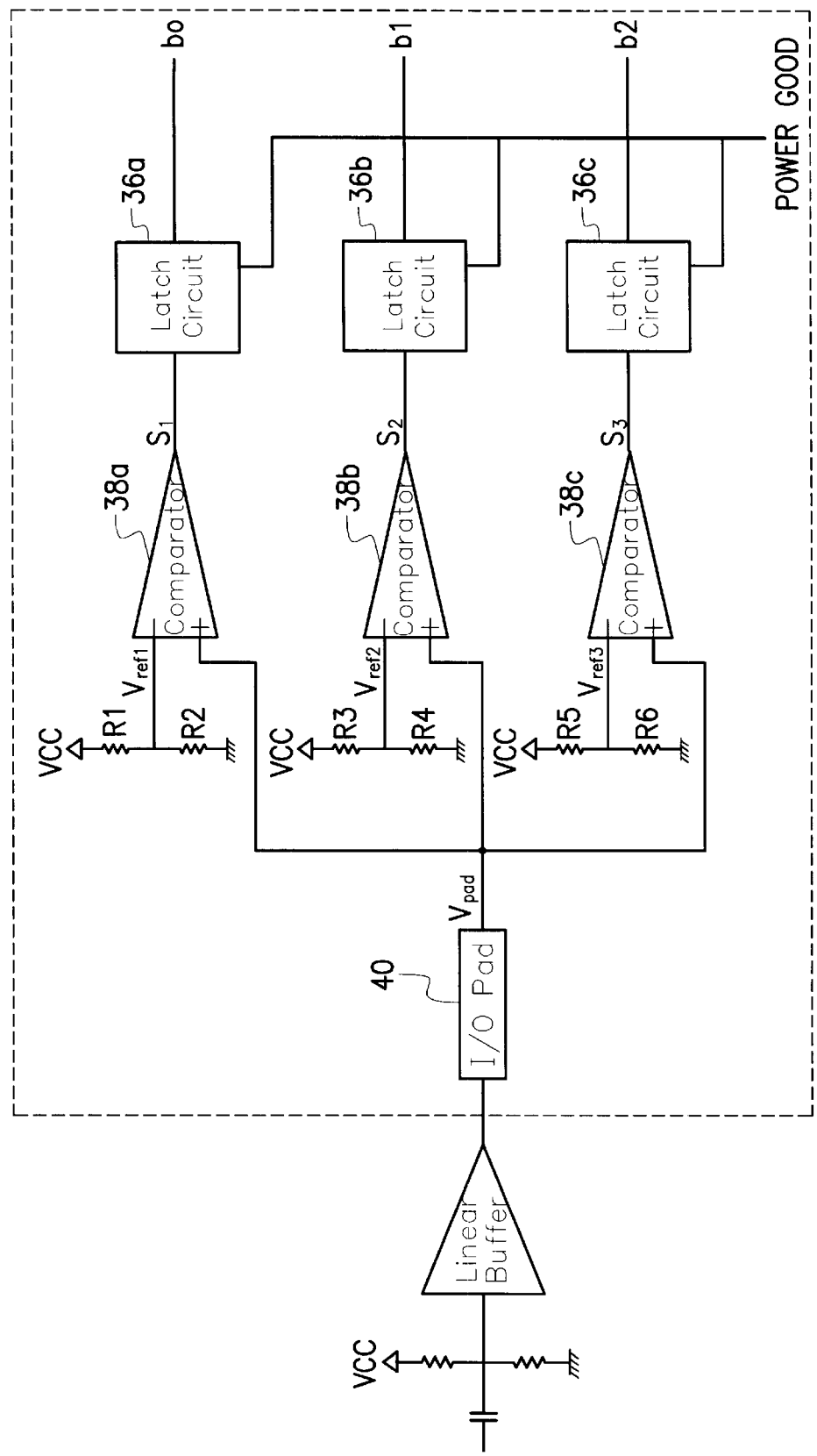
FIG. 4 is a schematic diagram of a chipset which is incorporated with the multi-option setting device of the invention, according to another preferred embodiment.

The invention as shown in FIG. 3 can have another option as shown in FIG. 4. FIG. 4 is a schematic diagram of a chipset which is incorporated with the multi-option setting device of the invention, according to another preferred embodiment. In FIG. 4, the latch circuit 36 of FIG. 3 is replaced with three latch circuits 36a, 36b, 36c. The operation principle is similar to the operation of FIG. 3. As the latch circuits 36a–36c respectively receive the results from the comparators 38a–38c, the latch circuits 36a–36c separately export the results in logic values so as to determine which purpose is intended on the I/O pad 40.

TABLE 1

| b0 | b1 | b2 | Function |
|----|----|----|----------|
| 1  | 1  | 1  | IDE      |
| 0  | 1  | 1  | AUDIO    |
| 0  | 0  | 1  | GPIO     |

For example, also referring to Table 1, if the comparision results of the latch circuits 36a–36c has the logic outputs (b0, b1, b2)=(1, 1, 1), it represents the current status is a pull-up status. In this case, the I/O pad 40 serves as an IDE pin. If the comparision results of the latch circuits 36a–36c has the logic outputs (b0, b1, b2)=(0, 1, 1), it represents the current status is a pull-low status. In this case, the I/O pad 40 serves as an AUDIO pin. If the comparision results of the latch circuits 36a–36c has the logic outputs (b0, b1, b2)=(0, 0, 1), it represents the current status is a dividing voltage status. In this case, the I/O pad 40 serves as a general purpose I/O (GPIO) pin. Therefore, the I/O pad 40 of the invention can be used at least for three diferrent uses.

Generally, the preferred embodiment of the multi-option setting devices shown in FIGS. 3 and 4 allow multiple functional uses on the connecting pins of the Southe Bridge chipset 30. However, in practice, not every connecting pin of the South Bridge chipset 30 can be selectively used for the multiple functional uses. To prevent interfering to the overall system operation by the setting, the invention is specifically used in association with a connecting pin that is used to output an AC signal, for example a loudspeaker connecting pin. In preferred embodiment, for example, the I/O pad 40 is connected to a loudspeaker connecting pin which is further connected to a loudspeaker 50, with the capacitor C being used for DC filtering of the output AC signal from the I/O pad 40. The user-specified input voltage provided by the voltage divider consisting of R7, R8 is input via the I/O pad 40 to the multi-option setting device to cause the multi-option setting device to set the connecting pin to the desired I/O function, for example an audio I/O function.

In conclusion, the invention provides a multi-option setting device for use in a chipset to allow a selective setting from more than two options to the chipset. In the embodiment of FIG. 3, for example, when the input voltage $V_{pad}$ is higher than all of the three reference voltages, causing (S1, S2, S3)=(1, 1, 1), the chipset 30 is set in such a manner as to use the I/O pad 40 for IDE2 I/O function; when the input voltage $V_{pad}$ is lower than all of the three reference voltages, causing (S1, S2, S3)=(0, 0, 0), the chipset 30 is set in such a manner as to use the I/O pad 40 for audio I/O function; and when the input voltage $V_{pad}$ is between the highest and lowest reference voltages, causing (S1, S2, S3)=(0, 1, 1) or (1, 0, 0), the chipset 30 can be set in such a manner as to use the I/O pad 40 for GPIO (General Purpose Input/Output) I/O function. Moreover, the coupling of the loudspeaker 50 to the voltage comparison circuit 34 would not affect the overall system operation since the loudspeaker 50 is driven by an AC signal.

The number of analog comparators in the voltage comparison circuit 34 can be increased to increase the number of setting options that can be selected. For example, the reference voltages can be set with an increment of 0.2 V to allow an increased number of setting options.

Therefore, the invention provides a multi-option setting device that allows the user to specify a certain voltage level, and the user-specified input voltage is then compared by a voltage comparison circuit to determine which voltage range the user-specified input voltage lies to thereby generate an output logic signal whose value corresponds to the desired option. This multi-option setting device allows the user to select from more than two options, while nevertheless allowing the overall system to operate normally without being affected by the setting.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A multi-option setting device for use in association with a connecting pin of a chipset for the purpose of allowing user-selection from multiple setting options to set the chipset to perform one of the input/output (I/O) functions through the associated connecting pin, the multi-option setting device comprising:

voltage setting means for generating a user-specified input voltage whose value corresponds to at least one I/O function that can be performed by the chipset through the associated connecting pin, with each I/O function corresponding to a prespecified range of voltage levels;

a voltage comparison circuit for comparing the user-specified input voltage against a plurality of preset reference voltages to thereby generate an output signal indicative of which prespecified voltage range the user-specified input voltage lies;

a latch circuit for latching the output signal of the voltage comparison circuit; and a control unit, in response to the latched output signal from the latch circuit, for setting the connecting pin to the user-selected I/O function corresponding to the user-specified input voltage.

2. The multi-option setting device of claim 1, wherein the voltage comparison circuit includes:

a plurality of analog comparators, each having a positive input end connected to receive the user-specified input voltage and a negative input end connected to receive one of the plurality of preset reference voltages, wherein the analog comparators are used to respectively compare the input voltage with the reference voltages and export a latch result to the latch circuit.

3. The multi-option setting device of claim 2, wherein the latch result comprises a latched logic result.

4. The multi-option setting device of claim 2, wherein the analog comparator generates a logic signal of 0 when the input voltage is greater in level than the reference voltage connected thereto, and generates a logic signal of 1 when the input voltage is lower in level than the reference voltage connected thereto.

5. The multi-option setting device of claim 2, wherein the analog comparator generates a logic signal of 1 when the input voltage is greater in level than the reference voltage connected thereto, and generates a logic signal of 0 when the input voltage is lower in level than the reference voltage connected thereto.

6. The multi-option setting device of claim 1, wherein the connecting pin is a loudspeaker connecting pin which is used to output an alternative-current (AC) signal to a loudspeaker with direct-current (DC) filtering on the AC signal.

7. The multi-option setting device of claim 1, wherein the I/O functions comprises a speaker pin.

8. A multi-option setting device for use in association with a connecting pin of a chipset, the multi-option setting device comprising:

voltage setting means for generating a user-specified input voltage whose value corresponds to at least one input/output (I/O) function that can be performed by the chipset through the associated connecting pin, with the I/O function corresponding to a prespecified range of voltage levels;

a plurality of analog comparators, each having a positive input end connected to the user-specified input voltage and a negative input end connected to a preset reference voltage, wherein the analog comparators are used to generate a first logic signal when the user-specified input voltage is greater in level than the reference voltage connected thereto, and a second logic signal when the user-specified input voltage is lower in level than the reference voltage connected thereto;

a latch circuit for latching the output signal of the voltage comparison circuit; and a control unit, in response to the latched output signal from the latch circuit, for setting the connecting pin to the user-selected I/O function corresponding to the user-specified input voltage.

9. The multi-option setting device of claim 8, wherein the first logic signal is 0, while the second logic signal is 1.

10. The multi-option setting device of claim 8, wherein the first logic signal is 1, while the second logic signal is 0.

11. The multi-option setting device of claim 8, wherein the connecting pin is a loudspeaker connecting pin which is used to output an alternatice-current (AC) signal to a loudspeaker with direct-current (DC) filtering on the AC signal.

12. The multi-option setting device of claim 8, wherein the I/O function comprises a speaker function.

* * * * *